Aug. 29, 1939.  R. WHITE ET AL  2,171,053
FISHING ROD AND SKI CLAMP AND CARRIER
Filed July 6, 1937
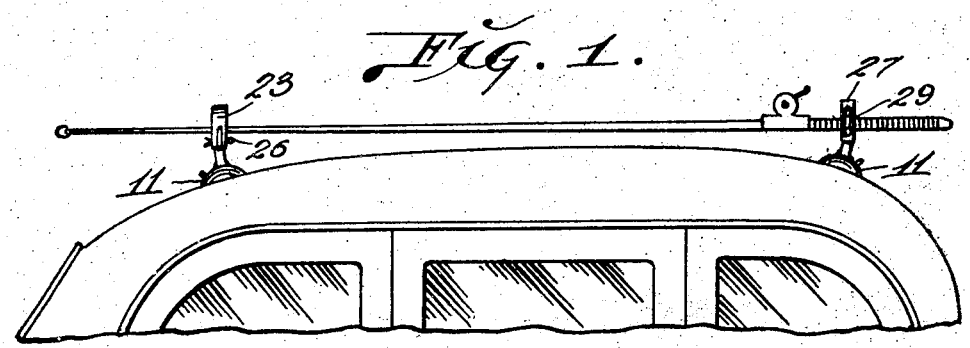
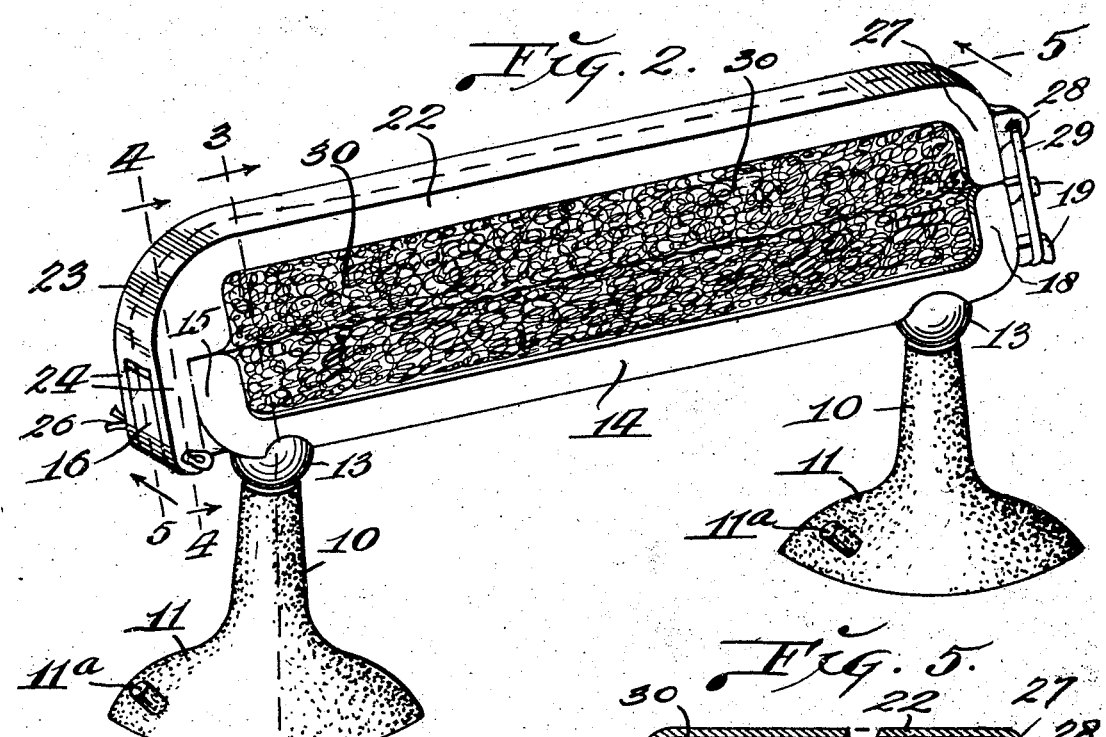
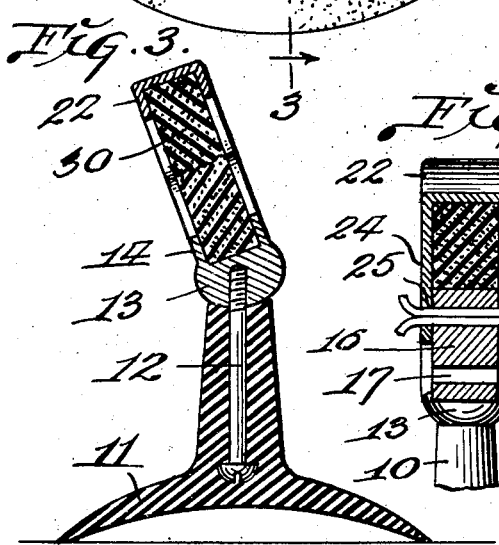
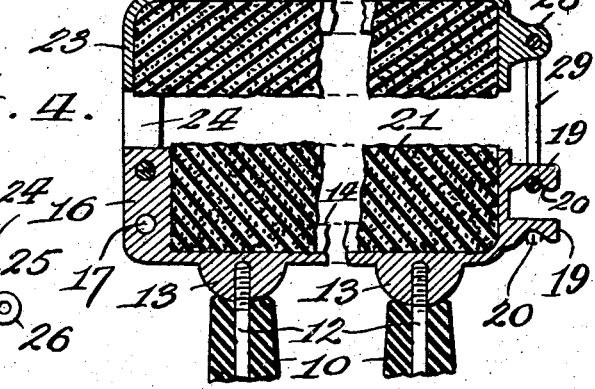
INVENTORS:—
ROGER WHITE AND
WILLIAM C. DANIELS.
BY Martin P. Smith ATTY.

Patented Aug. 29, 1939

2,171,053

UNITED STATES PATENT OFFICE 2,171,053

FISHING ROD AND SKI CLAMP AND CARRIER

Roger White, Lynwood, and William C. Daniels, Huntington Park, Calif.; said Daniels assignor to said White Application July 6, 1937, Serial No. 152,110

1 Claim. (Cl. 224—29)

Our invention relates to devices for clamping and carrying fishing rods, skis and the like on the tops of automobiles, and has for its principal object the provision of a relatively simple, practical and inexpensive clamp that may be easily and quickly applied to or removed from the top of an automobile and which will firmly clamp fishing poles, skis and the like so that the same are held and carried in an out-of-the-way position on top of an automobile.

A further object of our invention is to provide a clamp and carrier that will perform its intended function without scratching or marring the finish of the car or the rods, skis or other articles engaged by the clamps, and, further, to provide clamps and carriers of the character referred to that firmly hold the fishing rods or the like in straight position so as to eliminate any "set" or curvature of the rods while being supported and carried, and the carriers being located on the top of an automobile in no wise interfere with the opening and closing of all doors of the automobile.

With the foregoing and other objects in view our invention consists in certain novel features of construction and arrangements of parts that will be hereinafter more fully described and claimed and illustrated in the accompanying drawing, in which:

Fig. 1 is an elevational view of the upper portion of an automobile body and showing a pair of clamps and carriers positioned on the top of an automobile body and holding a fishing rod.

Fig. 2 is a perspective view of one of the clamps or carriers.

Fig. 3 is a vertical section taken on the line 3—3 of Fig. 2.

Fig. 4 is a vertical section taken on the line 4—4 of Fig. 2.

Fig. 5 is a vertical longitudinal section taken approximately on the line 5—5 and showing the upper portion of the clamp and carrier elevated with respect to the lower portion.

Referring by numerals to the accompanying drawing which illustrates a preferred embodiment of our invention, 10—10 designate short posts or uprights formed of rubber or composition of which rubber is the principal ingredient, and the lower ends of these posts terminate in enlarged vacuum suction cups 11 that are adapted to engage the smooth surface of the top of an automobile so as to firmly secure the clamps and carriers thereto.

In order to facilitate disengagement of the vacuum suction cups with the smooth surface to which they are applied, short studs 11a are formed integral with and project upwardly from the upper surfaces of said suction cups adjacent their edges.

Imbedded in the posts 10 are screws or bolts 12, the threaded upper ends of which project above the upper ends of the posts 10, and these projecting threaded portions are screw seated in studs 13 that are formed on the underside of a channel-shaped member 14, preferably formed of metal.

One end of the channel 14 is provided with an upturned end 15, which is channel-shaped in cross section, and formed integral with the outer end of this upturned portion is a vertically disposed block 16, having a pair of apertures 17, one disposed above the other.

The opposite end of member 14 is turned upwardly, as designated by 18, and formed integral with and projecting outwardly from the outer vertical face of this upturned end are spaced lugs 19, one disposed above the other, and formed in the under sides of these lugs are notches 20.

Seated within the channel-shaped member 14 and its upturned ends 15 and 18, is an elongated block or strip 21 of sponge rubber.

The upper member of the clamp and carrier comprises an inverted channel-shaped member 22, practically identical with the member 14, and said member having one end 23 turned downwardly so as to occupy a position directly above the upturned end 15 of member 14.

Depending from the outer portion of the downwardly turned end 23 are spaced plates 24 that occupy positions directly against the side faces of the block 16, and formed through the lower portions of these plates are aligned apertures 25.

A cotter pin 26 passes through the apertures 25 and either one of the apertures 17 in block 16, thereby providing a hinged connection between the upper and lower members 14 and 22.

In Fig. 2 the pin 26 is illustrated as passing through the lower one of the apertures 17 in block 16, which arrangement prevails when the clamp and carrier is adjusted for engaging small fishing rods or the small ends of said rods.

In Fig. 5 the pin 26 is illustrated as passing through the upper one of the apertures 17, and such arrangement maintains the upper part of the clamp and carrier elevated or spaced apart from the lower part so as to receive and firmly hold the butt portions of fishing rods or articles such as skis, which have a thickness of three-quarters of an inch, or more.

The end of member 22 opposite the depending end portion 23, is turned downwardly as designated by 27, and formed integral with and projecting outwardly from the end face of said depending portion is a lug 28, from which is pivotally suspended a link 29. The lower portion of this link is adapted when the clamp and carrier is closed, to engage in the notch 20 in either one of the lugs 19, depending on the position of the upper part of the clamp and carrier relative to the lower part.

Thus the link 29 serves as a latch to hold the clamp and carrier in closed position.

Secured within the inverted channel-shaped member 22 and its depending ends 23 and 27 is an elongated block or strip 30 of sponge rubber that is practically identical with the block 21, and when a fishing rod or the like is engaged in the clamp and carrier it contacts directly with the upper surface of the lower block 21 and the end surface of the upper block 30.

In the use of our improved clamp and carrier, the vacuum suction cups 11 are pressed firmly against the smooth finished surface of the top of an automobile body, and as a result of the suction produced within said cup the same will be firmly anchored to the vehicle top.

The links 29 are released from the lugs 19, thus enabling the upper members of the clamps and carriers to be swung upwardly a sufficient distance to receive the fishing poles, skis or other members to be carried, after which the upper members are swung downwardly and the links 29 engaged with the proper lugs 19, thus clamping the rods, skis or the like between the blocks or strips of sponge-like rubber 21 and 30.

Thus, the engaged poles or other members are firmly held in an out-of-the-way position on top of the automobile and as the vacuum suction cups and the rod engaging members 21 and 22 are formed of rubber the finish on the top of the automobile body and the finish on the rods or engaged members will not be scratched or marred.

When the clamp and carrier is adjusted for receiving small poles or the small ends of poles or the like, the hinged member 26 occupies the lower one of the apertures 17 in block 16, and as a result the upper edge of the sponge rubber strip 22 is in direct contact with the lower edge of the sponge rubber strip 30, as illustrated in Fig. 2.

When the clamp and carrier is adjusted for receiving the butt ends of poles or articles such as skis which have considerable thickness, the hinged pin 26 is positioned in the upper one of the apertures 17, as illustrated in Fig. 5, thus maintaining the upper and lower parts of the clamp and carrier in spaced relation.

Thus it will be seen that we have provided a fishing rod or ski clamp or carrier that is relatively simple in construction, inexpensive of manufacture and very effective in performing the functions for which it is intended.

It will be understood that minor changes in the size, form and construction of the various parts of our improved fishing rod and ski carrier for automobiles may be made and substituted for those herein shown and described, without departing from the spirit of the invention, the scope of which is set forth in the appended claim.

We claim as our invention:

A fishing rod and ski clamp and carrier for use on smooth finished surfaces, comprising a pair of rubber posts, vacuum suction cups formed on the lower ends of said posts, reinforcing members extending lengthwise through said posts and projecting from the upper ends thereof, a lower frame channel-shape in cross section and having upturned ends, which frame is detachably secured to the projecting upper ends of the reinforcing members in said posts, a lug projecting from one end of said lower frame, said lug being provided with a pair of apertures, one arranged above the other, a pair of spaced lugs projecting from the other end of said lower frame, one lug positioned above the other, a strip of sponge rubber carried by said lower frame, an upper frame channel-shape in cross section and having depending end portions, a strip of sponge rubber carried within said upper frame, a pair of ears depending from one end of said upper frame and provided with apertures that are adapted to coincide selectively with either one of the apertures in the lug on the lower frame, a pin adapted to be seated in the apertures in said ears and selectively in either one of the apertures in said lug and a link pivotally mounted on the other end of the upper frame for engaging selectively either one of the pair of lugs projecting from the end of the lower frame.

ROGER WHITE.
WILLIAM C. DANIELS.